3,686,077
PROCESS AND APPARATUS FOR
SEPARATING LIQUIDS
Hendrik de Koning, Geleen, Netherlands, assignor to
Stamicarbon N.V., Heerlen, Netherlands
Filed Apr. 1, 1970, Ser. No. 24,792
Claims priority, application Netherlands, Apr. 5, 1969,
6905359
Int. Cl. B01d 3/04
U.S. Cl. 203—40                                                4 Claims

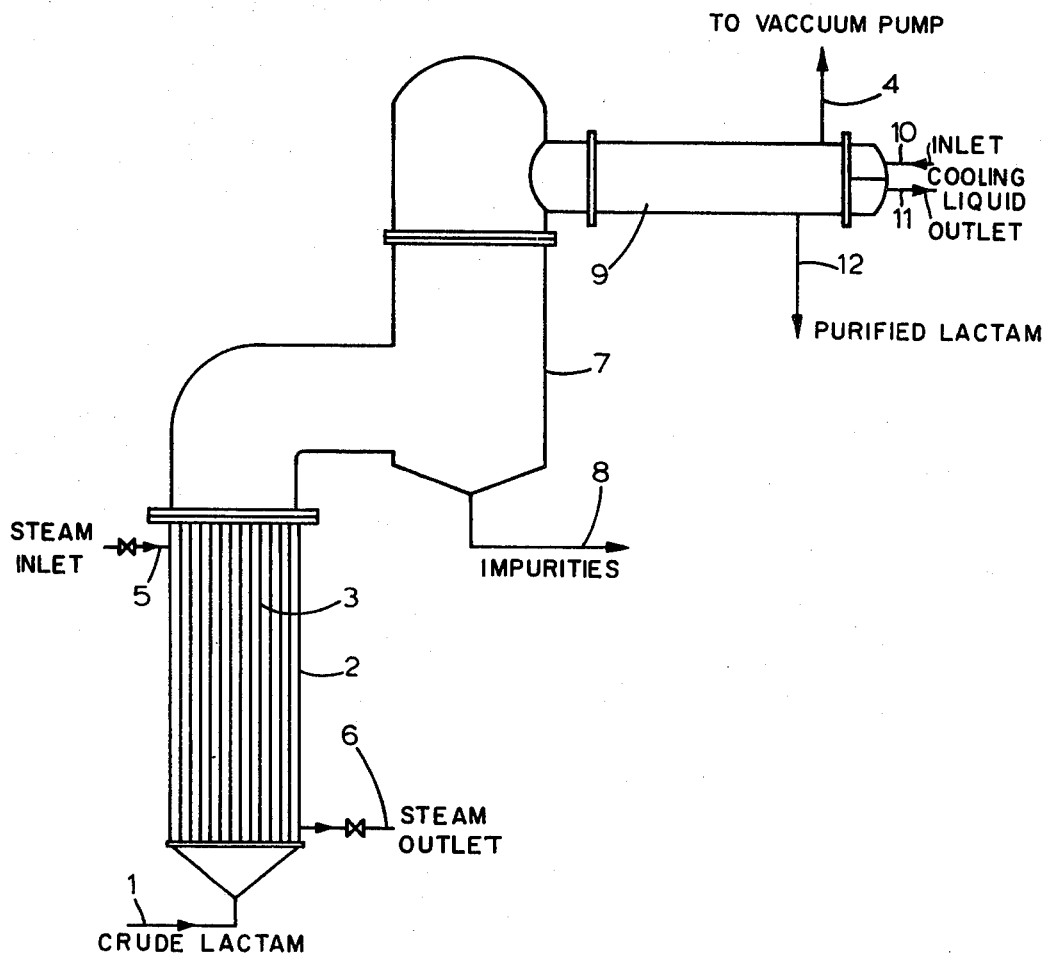

ABSTRACT OF THE DISCLOSURE

A process for the separation of lower boiling point liquids from those of a high boiling point, and apparatus therefor is disclosed. The liquid mixture is supplied to the base of the extractor and passed upwards under controlled temperature and reduced pressure in the vapor state through several tubes, whose length is from 15 to 35 times their diameter; the vapor leaves the tubes at a velocity approaching the velocity of sound in the vapor, and is subsequently condensed. The lower boiling liquid thus recovered is of high purity, often representing up to 90% of the total lower boiling fraction of the mixture entering the evaporator.

BACKGROUND OF THE INVENTION

The present invention relates to a process and apparatus for separating liquids of different boiling points, in which a mixture of the two is fed into the base of an evaporator operating on the co-current principle and equipped with vertical tubes in which the evaporator is heated so that the fraction of the mixture having the lower boiling point evaporates and issues at the top of the tube set together with drops of the higher-boiling liquid, to be passed onto a separator, in which the liquid drops are recovered from the vapor-liquid mixture.

A process such as a co-current evaporator is used in evaporating and/or purifying liquids whose taste is adversely influenced on heating, or which liquids tend to decompose when exposed to a high temperature for a period of time. Evaporation of such thermally unstable substances is therefore effected at the lowest possible temperature. In addition, the period of time for which these substances are exposed to an elevated temperature is carefully controlled in order to maintain a minimal exposure time.

A low treatment temperature is obtained by effecting the evaporation at a low pressure using a partial vacuum. The reduction in boiling point thus realized under reduced pressure has the additional advantage that less heat is needed for raising the liquid to its boiling temperature and evaporating it, and that the temperature of the heating medium can be reduced correspondingly lower.

The time the liquid remains in the evaporator (described herein as residence time is shortened by raising the rate of evaporation, which in prior art apparatus, is done by using a large heated area. To this end, the evaporation is carried out in a device comprising a large number of long narrow tubes—having a length generally about 6 m. and an internal diameter of about 2 cm. A disadvantage of this design is that the flow resistance experienced by the vapor within the long narrow tubes is very high. Moreover, the static pressure of the liquid within the narrow tubes is higher than the static pressure of the same amount of liquid would be in tubes of greater internal diameter. The result is that the pressure within the tubes is considerably higher than the subatmospheric pressure produced by the vacuum device. Thus the practical result is that the shortening of the residence time of the mixture in the evaporator obtained is at the expense of at least part of the reduction in boiling point as originally intended. With respect to design, prior art apparatus has the disadvantage of great height and the concomitant difficulty of cleaning the long narrow tubes.

In view of these disadvantages, the evaporation of thermally unstable substances is in many cases conducted in a large diameter cylindrical column. The liquid to be separated in the column is fed at the top and distributed in a thin layer over the heated inner surface of the column by a rotary device contained within the column. The pressure rise in such an evaporator is slight and the rate of evaporation fairly high. The non-evaporated fraction is discharged from this evaporator at the bottom. To prevent local overheating of the liquid, it is important the inner wall of the column be wetted over its entire surface. Consequently a substantial amount of liquid has to be discharged at the bottom so that, generally, this fraction will still contain a rather considerable amount of the low-boiling fraction of the mixture. Further disadvantages of this apparatus are also its great height and the complication caused by the use of the rotary distribution devices and their drive systems.

Short tube evaporators are also known in the art in which the liquid follows a circular path leaving the short tubes at the top, circulating through the evaporator, and re-entering the tubes at the bottom. In these short tube evaporators the residence time of the liquid is high, in fact so high as to render them unsuitable for evaporating thermally unstable substances.

The present invention provides a process and apparatus free from the above disadvantages.

OBJECTS OF THE INVENTION

An object of this invention is to provide a method and apparatus for efficient evaporation of the lower boiling fraction from a thermally unstable liquid under reduced pressure and at a temperature below the boiling point of the lower fraction at atmospheric pressure while maintaining the residence time of the lower boiling fraction in the evaporator at a minimum.

Another object is to provide a method of extraction having a high percentage of recovery of the lower boiling fraction from a thermally unstable mixture.

Another object is to remove impurities from caprolactam by distillation.

Other objects will be apparent to one skilled in the art.

DESCRIPTION OF THE INVENTION

The above problems of the prior art have been resolved, according to the invention, by feeding the liquid mixture to be separated into an evaporator whose tube length amounts to 15 to 35 times the tube diameter (the tubes generally having a suggested length of 0.75 to 2.5 m.), while the heat supply is controlled so that the velocity of the vapor in leaving the tubes approaches the velocity of sound within this vapor. It is preferred that this velocity be at least 0.8 times the velocity of sound.

Due to the use of short wide tubes according to the present invention, the flow resistance, and consequently the pressure loss, will be lower than in the known prior art apparatus, not withstanding the high velocity applied. The static pressure of the liquid in the tubes will be lower than it would be if narrower tubes were used. As a result of the lower pressure in the tubes, the boiling point temperature of the liquid is correspondingly depressed. The reduction of the heat transfer caused by the use of a smaller heated area, as compared to prior art methods, is compensated, at least in a large measure, by the higher heat transfer coefficient resulting from the high vapor velocity attained. Through a judicious choice of the temperature of the heating medium, the heat supply can be so adjusted as to give the evaporator the requisite volume capacity. Thus the temperature of the tubes of the evaporation is from about 40 to about 60° C. above the boiling point of the lower boiling fraction. In that the path to be travelled by the vapor is short and the vapor velocity high, the liquid has a short residence time in the apparatus. Consequently, the liquid's exposure to a high temperature is shorter than in the prior art types of apparatus.

The present invention is particularly suited for application in the treatment of liquids of high boiling point, for instance in the recovery of high-boiling fractions from caprolactam.

The figure is a schematic view of the apparatus according to the invention.

The invention will now be further explained with reference to the embodiment shown in the drawing.

EXAMPLES OF THE INVENTION

For purposes of the example, a description is given of the purification of caprolactam by distillation. Following preparation of caprolactam, as described, for instance in the U.S. Pat. 2,993,889, the lactam still contains a minute amount of components having a higher boiling point than that of the pure lactam. The quality of the lactam can be improved by removing this undesirable fraction. In order to remove the higher boiling undesirable components from the lactam, the mixture is fed into the base of evaporator 2 through conduit 1.

The evaporator 2 comprises a plurality of tubes 3, for instance 1200 mm. in length and having an internal diameter of 45 mm. The evaporator is connected by way of liquid separator 7 and condenser 9 to vacuum line 4 maintained at a pressure of 4 mm. Hg. The pressure inside the evaporator tubes 3 is about 10 mm. Hg in large measure due to losses caused by the resistance within the apparatus. The boiling point of caprolactam at this pressure is 130° C. Steam at 180° C. is passed through line 5 into the evaporator 2. The steam flows around the tubes and leaves the evaporator 2 through line 6. Under these conditions the heat supply is such that the caprolactam—which preferably is fed into the evaporator at a temperature equal to its boiling temperature of about 130° C.—evaporates almost immediately upon entering the tubes.

The resulting vapor, which at this low pressure takes up a large volume, leaves the tubes with a high velocity, carrying with it the non-evaporated liquid. For example under the above conditions, the velocity of the vapor is about 150 m./sec. This is not far below the velocity of sound in caprolactam vapor, which is calculated to be 178 m./sec. according to the following formula:

$$V_c = 64.2 \sqrt{\frac{c_p}{c_v} \frac{T}{d}}$$

wherein:

$c_p$=specific heat at constant pressure,
$c_v$=specific heat at constant volume,
T=absolute temperature, ° K.,
d=relative density.

Substituting for specific values:

$$64.2 \sqrt{1.08 \times \frac{403}{61.5}} = 178 \text{ m./sec.}$$

After leaving the tubes, the vapor liquid mixture flows into liquid separator 7. The liquid recovered containing a small portion of caprolactam together with the higher boiling impurities is discharged through line 8 and returned to the caprolactam production system, as previously described. The vapor discharged from liquid separator 7 flows through condenser 9 which is connected to the vacuum line 4. A cooling liquid is circulated in the condenser, which is supplied through line 10 and discharged through line 11. The pressure in the condenser 9 is 4 mm. Hg and the temperature 118° C.

The purified caprolactam is removed in the liquid state through line 12. The quantity of the purified lactam discharged may be over 90% of the amount supplied. The purity of this product is very high, while a small portion of the purified product finds its way into the residue through line 8. As previously discussed in the prior art apparatus, a high degree of purity can only be achieved by carrying out the separation in such a way that a high percentage of the pure product is lost to the residue portion.

In operation, vacuum line 4 is connected to a suction unit (not shown), which maintains the required pressure in the condenser and removes inert gases which may have entered the system and are not condensed at the temperature prevailing in the condenser. The amount of product discharged through the suction unit may constitute as much as about 1% of the total amount of product, and can be conveniently recovered in a separator located downstream from the suction unit.

I claim:

1. Process for separating under reduced pressure a thermally unstable mixture comprising lower boiling point liquids from a liquid of a high boiling point, comprising the steps of:
   (a) supplying said thermally unstable mixture to the bottom of an evaporator having a plurality of vertical tubes therein;
   (b) maintaining the evaporator under reduced pressure;
   (c) heating said tubes at a temperature from about 40 to about 60° C. above the boiling point of the lower boiling fraction at the reduced pressure in the evaporator;
   (d) evaporating that fraction of said thermally unstable mixture having the lower boiling point;
   (e) passing the vapor resulting from the evaporation through said tubes from about 0.75 m. to about 2.5 m. long, said length from about 15 to about 35 times the diameter of said tubes;
   (f) adjusting the reduced pressure inside said tubes and the amount of heat supplied to the mixture to be separated to cause said vapor resulting from the evaporation to pass through said tubes at a velocity of at least 0.8 times, but not exceeding the velocity of sound in said vapor as the vapor leaves said tubes;
   (g) carrying all of the liquid drops of the higher boiling liquid in the vapor resulting from the evaporation of step (d) to the top of the vertical tubes;
   (h) separating the said liquid drops of the higher boiling liquid from the vapor of step (f) and discharging said drops from the evaporator; and
   (i) condensing the resulting vapor.

2. A process according to claim 1 including the additional step, prior to step (a), of preheating said thermally unstable mixture to a temperature about equal to the boiling point of the lower boiling fraction at the prevailing pressure in the evaporator.

3. A process according to claim 1 wherein caprolactam and impurities are present in the thermally unstable mixture to be separated, caprolactam is removed as the lower boiling liquid and the impurities are removed as the higher boiling liquid.

4. Apparatus for separating under reduced pressure a mixture of thermally unstable liquids differing in boiling point comprising:
   a single pass evaporator including a vertical tube bundle, each tube having a length of about 0.75 m. to about 2.5 m., the tube length from about 15 to 35 times the tube diameter;
   means for suppling a stream of mixed liquids to the base of said tube bundle;
   means for heating the tubes to raise the temperature therein sufficient to evaporate at least one liquid of the mixture at the reduced pressure within the tubes;
   a separator for separating the evaporated liquid from the unevaporated liquid;
   conduit means from the separator for withdrawing and discharging the unevaporated liquid;

condenser means communicated to the separator for withdrawing and condensing the evaporated liquid;

suction means communicated to the condenser for lowering the pressure substantially lower than atmospheric pressure in the condenser means and the evaporation means, the pressure in the condenser means lowered slightly greater than that in the evaporator means.

References Cited

UNITED STATES PATENTS

| | | | |
|---|---|---|---|
| 1,735,980 | 11/1929 | Sadtler | 159—27 |
| 1,872,554 | 8/1932 | Badger | 159—27 |
| 2,265,762 | 12/1941 | McKittrick et al. | 203—99 |
| 2,519,618 | 8/1950 | Wilson | 159—27 |
| 2,543,001 | 2/1951 | Dean | 202—153 |
| 2,732,008 | 1/1956 | Seeley | 159—27 A |
| 3,165,435 | 1/1965 | Henszey | 159—27 |
| 3,459,640 | 8/1969 | Tsunawki et al. | 203—90 |

WILBUR L. BASCOMB, JR., Primary Examiner

U.S. Cl. X.R.

203—89, 91, 99; 159—27 A; 202—197, 237; 260—239.3 A